Dec. 21, 1937.    J. C. HORNUNG    2,103,113
REGULATING APPARATUS
Filed June 21, 1935    2 Sheets-Sheet 1
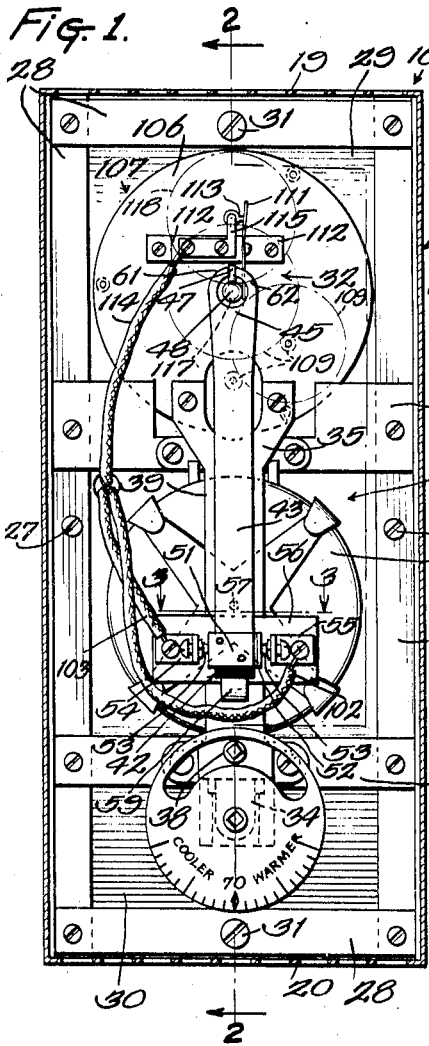
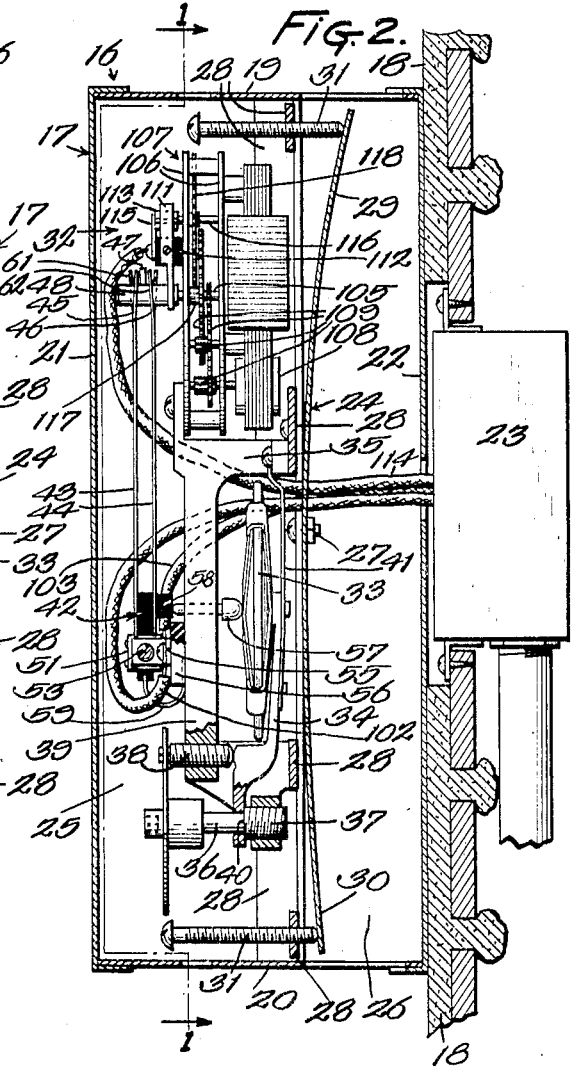
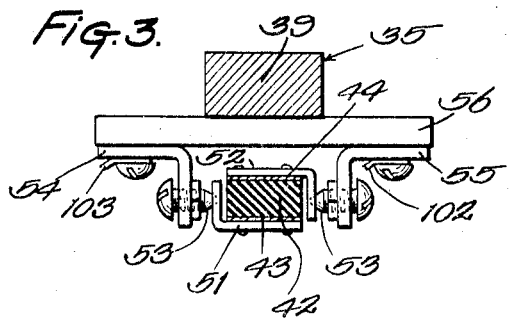
INVENTOR:
JOHN C. HORNUNG
BY John H. Nelson
ATTY.

Dec. 21, 1937.   J. C. HORNUNG   2,103,113
REGULATING APPARATUS
Filed June 21, 1935   2 Sheets-Sheet 2
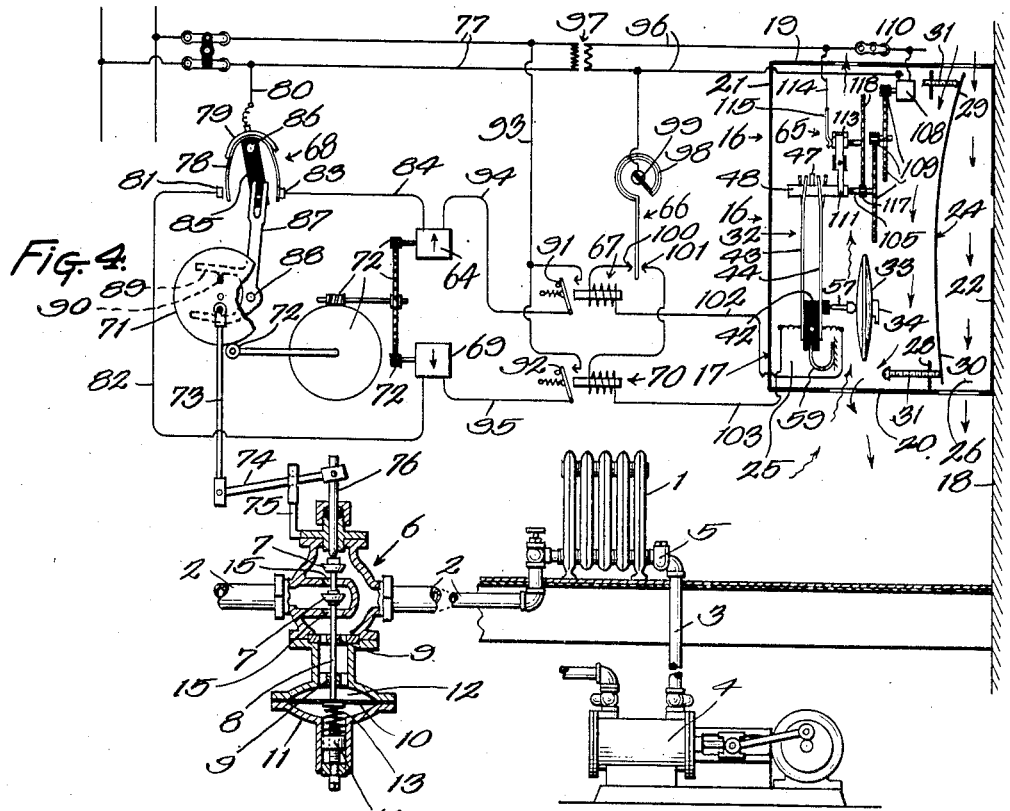
INVENTOR:
JOHN C. HORNUNG
BY John H. Nelson
ATTY.

Patented Dec. 21, 1937

2,103,113

UNITED STATES PATENT OFFICE 2,103,113

REGULATING APPARATUS

John C. Hornung, Glencoe, Ill., assignor to Illinois Engineering Company, Chicago, Ill., a corporation of Illinois Application June 21, 1935, Serial No. 27,650

6 Claims. (Cl. 200—139)

This invention relates to regulating apparatus for power circuits, and more particularly aims to provide a thermo or temperature controlled switch having the least amount of operating parts, for regulating the opening and closing of an electric circuit or circuits at intervals of given cycles, wherein the durations of the intervals will be proportionate to changes in temperature from a given normal to which the switch is responsive. The invention is of especial utility when employed in connection with heating systems having electrically operated valve means or the like to control the flow of the heating medium in maintaining a normal room temperature, wherein the opening or closing operation of the valve would be rendered intermittent so that each movement of the valve would be an amount in accordance with the temperature demand of the system to prevent overcorrection.

Another object is to provide such a switch that will be simple in construction, dependable in operation, and that by employment of the fewest number of parts will be capable of adjustment to regulate the intervals of opening and closing of the circuit or circuits with respect to changes in temperature influencing the switch, in causing same to function properly under the various conditions of the installation it is to be associated with, such as location of radiating means of the heating system, the size of the room or rooms to be heated, or the capacity of the heating plant, etc.

Other objects and advantages will become apparent by reference to the specification and the accompanying drawings, in which:

Fig. 1 is an enlarged front sectional view of temperature regulating apparatus of the invention, or regulator embodying the thermo control switch of the invention, the view being taken substantially on the section line 1—1 of Fig. 2.

Fig. 2 is a vertical section of Fig. 1, as taken substantially on the section line 2—2 of said figure, and showing said apparatus or regulator applied to a room wall.

Fig. 3 is a detail plan section of certain parts shown in Fig. 1, the view being taken substantially on the section line 3—3 of said figure.

Fig. 4 is a diagrammatic illustration of the said apparatus or regulator in connection with a temperature conditioning system.

Fig. 5 is an enlarged detail elevation of certain parts seen in Fig. 1, with certain parts shown in changed position.

Fig. 6 is a side view of the parts shown in Fig. 5, with certain hidden elements included, parts in section, and other parts broken away.

Fig. 7 is a view showing certain parts of Fig. 6 in another changed position.

Fig. 8 is a plan view of the parts shown in Fig. 7.

Certain structure herein disclosed in connection with which the present invention forms one embodiment, forms substantially part of the subject matter of my Patent No. 1,919,330, of July 25, 1933, in which said certain structure is generally disclosed and claimed.

The temperature conditioning system, or heating system, shown in carrying out the invention, is that of the type employing a vaporous temperature conditioning medium such as steam, although the invention is advantageously adaptable to systems employing other types of heat transfer mediums as well, such as water, air or electricity.

The system includes radiating means 1 in the form of a room radiator connected in supply communication with a steam supply pipe 2, and from which continues a return pipe 3 through which the condensed steam passes back to the boiler (not shown) by way of a suitable vacuum pump 4, which passage is controlled by the usual thermostatic valve 5.

In the steam supply pipe 2 is means for controlling the flow of steam to the radiator, in controlling room temperature, such as a pressure regulating device or valve 6 of a common type for regulating the pressure under which steam will flow to the radiator. Said valve device includes the valves 7 mounted on a vertical valve stem 8 which is slidable in bearings 9. The bottom of the valve stem is secured to a pressure responsive diaphragm 10 which centrally divides the enlarged chambered lower end portion 11 of the device. The chamber portion 12 above the diaphragm is in constant steam pressure communication with the radiator and a compression spring 13 is interposed between the bottom of the diaphragm and an adjustable nut 14. Thus when the steam pressure in the chamber portion 12 overcomes the resistance of the spring, the positions of the valves 7 with respect to the valve openings 15 will be regulated in controlling steam flow in accordance with the pressure in the radiator.

The invention is preferably, although not essentially, employed in connection with room temperature regulator means generally disclosed and claimed in said patent, for controlling the heating system in accordance with wall temperature changes caused by exterior temperature changes and wind conditions. The regulator means includes a regulator 16, diagrammatically shown in Fig. 4, in controlling connection with the heating system, and separately and more completely shown in Figs. 1 and 2. The regulator includes an elongated box like housing 17 mounted upon the room wall 18 in a vertical position. The housing has perforated end walls 19 and 20 to permit passage of air through the housing. The housing has a front cover 21 and a bottom base portion 22 disposed against the wall and suitably secured to the electric outlet box 23 mounted in the wall.

Centrally disposed and longitudinally extending within the housing is an air flow controlling partition 24 which divides the housing into outer and inner compartments 25 and 26 respectively. The partition comprises a thin sheet of flexible metal and is secured at its central portion by screws 27 to the rear side of an open framework 28 mounted longitudinally in the housing. The ends of the partition form damper portions 29 and 30 which are adjusted by adjusting screws 31 threaded through the ends of the framework for controlling the flow of air currents along the wall through the housing.

Disposed within the outer compartment 25 of the housing is thermo-actuated switching means 32 for controlling the operation of the valve device through the intermediation of electrical apparatus, later described, to regulate the flow of steam to the radiator in accordance with air current conditions along the room wall surface caused in the event of exterior temperature changes and as directed and proportioned by the dampers 29 and 30 through the outer compartment 25 of the regulator housing. For instance, in the event of a sudden drop in exterior temperature in comparison with that of the room or a change in wind conditions, a cold air current will be caused to flow downward along the room wall surface (as shown by the straight arrows in Fig. 4), and the temperature of this cold air current and its commencement will be dependent on the thermal resistance of the wall, so that if the room wall offers little resistance to exterior temperatures, then more heat is required in the room, and the greater its resistance the less heat is required. Therefore, if the room wall offers little resistance, the top damper 29 is adjusted to admit more of the cold air current into the compartment 25 and the bottom damper 30 is adjusted to admit into said compartment a small amount of the warm air current flowing upward along the wall caused by the radiator (as indicated by wavy arrows in Fig. 4), whereupon the thermo-actuated switch will respond to a mean temperature between the opposing air currents that is in accordance with the thermal resistance of the wall, whereby the flow of steam to the radiator is regulated accordingly and a predetermined room temperature substantially maintained.

Generally the foregoing organization is broadly disclosed and claimed in said patent, in connection with which organization the invention contemplates improved means for more accurately controlling the heating system in accordance with temperature requirements.

The thermo-actuated switch and its operable connection to the valve device 6 will now be described. In accordance with the invention a variable sliding contact switch is provided for controlling the heating system in accordance with temperature requirements. The switch comprises a thermo-responsive element or device 33 in the form of a common hollow disc-like diaphragm containing a volatile liquid, and which is mounted at its central rear portion on the top end of a vertical lever 34 adjustably mounted, for reasons later described, on a bracket 35 secured to the framework 28. For adjustably mounting the lever, its lower end is apertured to receive the reduced forward portion 36 of an adjusting screw 37 threaded into the bracket in providing an adjustable fulcrum. Another adjustable fulcrum is provided for the lever which is inclusive of an adjusting screw 38 threaded into a vertical portion 39 of the bracket which extends in front of the diaphragm, which screw extends through the bracket portion to engage the midportion of the lever. The lever is held in engagement with the screw 38 and the shoulder 40 of the screw 37 by a leaf spring 41 extending upward of the lever into engagement with the bracket. Thus by adjusting the screws 37 and 38 the diaphragm may be adjusted in a straight line movement forwardly or rearwardly, or either screw may act as a fulcrum upon adjustment of the other screw.

Arranged normally in vertical position in front of the bracket portion 39 is a switch lever 42 of insulating material upon whose front and rear faces are respectively mounted circuit closing elements 43 and 44 in the form of elongated flexible metal strips extending upward into circuit closing sliding contact end portions 45 and 46 respectively. Disposed between said end portions is a circuit continuing element for cooperating with either of the end portions upon actuation of the diaphragm. The said element is in the form of a contactor pin 47 extending laterally of a continuously rotating shaft portion 48 which extends freely through concentric openings in the strip end portions 45 and 46 and respectively indicated at 49 and 50.

For providing terminals for the circuit closing strips 43 and 44, as well as providing a pivotal connection for the lever 42 mounting same, the lower ends of the strips have secured thereon similar transverse metal strips 51 and 52 respectively, which in turn respectively extend along opposite sides of the lever 42 into pivotal connection, as at 53, with terminal strips 54 and 55 mounted on the bracket portion 39 through the intermediation of a suitable insulating base block 56.

The lever 42 is operably connected with the diaphragm 33 to be actuated thereby upon expansion or contraction thereof as same responds to various temperatures, by means of a horizontal pin 57 reciprocably mounted in the bracket portion 39 and contacting at its ends respectively with the central part of the front of the diaphragm and an insulating abutment 58 on the rear side of the lever. The lever is maintained in contact with the pin 57 and the pin in turn maintained in contact with the diaphragm by means of a leaf spring 59 extending downward of the lever and anchored at its end to the bracket portion.

The end portions 45 and 46 of the circuit closing strips 43 and 44 are each similarly arranged whereby, upon a complete revolution of the shaft portion 48 mounting the circuit continuing pin 47, either end portion, when actuated by the diaphragm into the path of the pin, will be in sliding contact with the pin during various degrees of its movement which are determined by the responsive action of the diaphragm. To accomplish this, (see Figs. 5 and 6) each strip end portion is bifurcated as at 60 from its opening forming concentric arcuate prongs 61 and 62 respectively bent outward and inward of the path of the pin 47, as it rotates with the shaft portion 48 in counter-clockwise direction as viewed from the front, to form a helical cam surface 63 arranged to deflect the strip by engagement with the pin as it rotates. Normally the pin 47, during its movement, just clears the ends of the opposed prongs 62 of the strips when the diaphragm is under the influence of a predetermined room temperature, which in most cases would be about 70 degrees. The strips 43 and 44 are of such length and thickness as to have sufficient resiliency on the lever 42 to be movable into and out of position thereon during deflecting engagement of their end portions with the contact 47, so that displacement of the lever during such movement of either strip is prevented to insure accuracy of operation of the switch and the thermo-responsive element 33 associated therewith, in that no great amount of counteracting force is exerted at any time upon the element 33.

In the event the diaphragm responds to a slight increase in room temperature beyond normal, the lever 42 will be slightly actuated to cause a very short portion of the helical cam surface 63 of the strip 44 to be brought into the path of the pin 47, whereupon the pin will have sliding contact with said surface during a short period or degree of one revolution thereof, as indicated at A in Fig. 5. In the event the room temperature continues to increase, the diaphragm will so actuate the lever 42 to cause a proportionately greater part of said cam surface to have sliding contact with the pin, which, in an extreme case, may include the entire surface.

Referring to Fig. 4, generally, when the circuit closing strip 44 is actuated by the diaphragm to contact with the circuit continuing pin 47, an electric circuit is closed in a motor 64, by way of a circuit interruptor 65, a thermostat 66, a relay 67 and a limit switch 68, later described, whereby the motor is energized at intervals corresponding with the cycles of movement of the pin and of durations determined by the degree of sliding contact between the pin and the strip end, whereupon the motor causes the closing of the valves 7 at various intervals, through suitable reduction gearing and levers, in variously delaying the valve closing operation in accordance with the temperature requirement or demand of the system.

In this way the valve closing operation may continue until the rate of flow of steam to the radiator is restricted in accordance with that demanded by the regulator, whereupon the closing operation ceases with the valves 7, in some instances only partially restricting the valve openings 15.

Likewise, in the event the room temperature drops below normal, the diaphragm will actuate the lever 42 to cause the circuit closing strip 43 to contact with the circuit continuing pin 47, whereupon an electric circuit is closed in a motor 69, by way of the interruptor 65, the thermostat 66, the limit switch 68 and a relay 70, whereby the motor, which drives in opposite direction to the motor 64, is also energized at intervals corresponding with the cycles of movement of the pin and of durations determined by the degree of sliding contact between the pin and the strip end. As the motor is so enerzied, it causes the valves 7 to open, or be moved away from their valve openings regardless of their initial positions, at various intervals through intermediation of said reduction gearing and levers, in similarly delaying the valve opening operation in accordance with the temperature demand of the regulator.

By reason of the resilient and yet bendable strips 43 and 44 of the switch, same is rendered adjustable in regulating the durations of sliding engagement between the contact 47 and either strip end portion at a position of displacement of the switch lever 42, to cause the switch to operate the valve at intervals having durations in accordance with the condition under which it is to cooperate with the heating system, as to location of the radiator in a room, the size of the room to be heated, and the efficiency of the heating plant. To this end the pitch angle of the helical cam surface formed by the prongs 61 and 62 on each strip end may be varied by bending the prongs by hand, or with the aid of a simple tool, so that the prongs are urged in opposite directions, and then by bending the strip having the prongs, in a certain direction toward or away from the path of the contact pin until the end of the prong 62 initially engaged by the pin will be properly positioned with respect to the path of the pin in accordance with the neutral position of the lever. Thus any length of the cam surface of a strip may be brought into the path of the pin at any position of displacement of the switch lever, by simply bending the strip and its prongs to meet any condition under which the apparatus is to function.

By virtue of this variously lagging or retarded controlling operation, the mean effective temperature in the radiator will not greatly deviate from the temperature demanded by the regulator, because it allows sufficient time for the radiator to effect a circulation in the room of air affected thereby as demanded by the regulator to establish a more even temperature in the room upon which the regulator is to determine a further demand of the system. Thus a more accurate control system will be had.

The motors 64 and 69 are operably connected with the valves 7 to operate same by means of the following. The motors are arranged and operably connected to drive a large gear 71 in opposite directions respectively through the intermediation of suitable reduction gearing 72 common to both motors. Eccentrically pivoted on the gear 71 is a pitman 73 which is pivotally connected at its other end to one end of a rocker arm 74 which is centrally fulcrumed to a bracket 75 on the valve device 6. The other end of the rocker arm is pivoted to a pin 76 which projects downward through the valve device into contact with the valve stem 8, to positively move the stem to close the valves 7 upon energization of the motor 64, or to control the opening of the valves by action of the spring 13 upon energization of the motor 69.

When the pitman 73 is between its extreme dead center relations with respect to the gear 71 with the valves 7 intermediate their limits of movement, one side of each motor will be in circuit connection with one side of the power lines 77 of suitable voltage, ordinarily 110 volts, through the intermediation of the limit switch 68, which, upon the pitman reaching one limit of its movement upon operation of one of the motors, breaks its circuit connection. Said switch comprises a U shaped spring 78 held under tension by and secured centrally within a rigid arcuate base 79 connected to one of the power lines 77 by way of a conductor 80. Normally, when the pitman and valves are intermediate their limits of movement, one end of the spring 78 will be in contact with a terminal 81 connected to one side of the motor 69 by way of a conductor 82, and the other end of the spring will be in contact with a terminal 83 connected to one side of the motor 64 by way of the conductor 84. The base 79 is mounted on a lever 85 of insulating material which is pivoted at 86, and which is operated by the gear 71, upon the pitman and valves 7 reaching one limit of their movements, by actuation of either motor, to break the circuit of the motor by moving the spring 78 out of contact with said motor's limit switch terminal, and which circuit connection is again established upon initial energization of the other motor. To this end, the lever 85 has sliding pivotal connection with one arm portion of a bell-crank 87 pivoted at 88, and whose other arm portion is forked, as at 89, to be operated by an eccentric pin 90 on the rear side of the gear 71.

Circuit connection with the power lines 77 is completed to the motors 64 and 69, by way of the relays 67 and 70, respectively controlling magnet operated switches 91 and 92 in common circuit connection with the other side of the power lines through a conductor 93, and respectively connected to the motors by conductors 94 and 95.

Power lines 96, of about 24 volts, are provided for the magnets of the relays 67 and 70, as controlled by the thermo-actuated switch 32, by means of a transformer 97 in the power lines 77.

The thermostat 66 is provided for controlling the circuit connection of the magnet of either relay with one side of the power lines 96, whereby it will cooperate with the thermo-actuated switch 32 in maintaining a more even room temperature, in that the thermostat may be situated in a part of the room quite remote from the said switch 32. The thermostat includes a thermo-responsive element 98 in the form of a bimetallic strip whose anchorage 99 is connected to one side of the power lines 96, and whose free end is disposed between two terminals 100 and 101 which are respectively in circuit connection with the magnets of the relays 67 and 70.

Circuit connection with the power lines 96 is completed to the magnet of the relay 67 by the circuit closing strip 44, in causing the motor 64 to close the valves 7, through a conductor 102, when said strip engages the circuit continuing pin 47 which in turn is in circuit connection with the other side of said power lines by way of the interruptor 65, later described. Likewise, circuit connection with said power lines is completed to the magnet of the relay 70 by the circuit closing strip 43, in causing the motor 69 to open the valves 7, through a conductor 103, when said strip engages the circuit continuing pin 47.

The interruptor 65 is provided for further delaying the controlling operation of the valves 7, wherein, during a given number of revolutions of the pin 47 with its shaft portion 48, circuit connection from the shaft portion to its side of the power lines 96 is established, after which period said connection is broken during a given number of revolutions of said shaft portion. Thus, assuming that one of the circuit closing strips has been actuated by the diaphragm so that its helical cam end is being contacted by the pin 47 at spaced intervals corresponding with the revolutions of same with its shaft portion, the opening or closing operation of the valves 7 will be effected during intervals spaced in accordance with said shaft revolutions at intermittent periods determined by the interruptor. In this manner the interruptor further cooperates to allow sufficient periods of time for the radiator to effect a circulation in the room of air affected thereby before the regulator effects a further temperature demand of the system, as stated generally in the foregoing.

The interruptor, operating means therefor, as well as means for driving the shaft portion 48 carrying the pin 47 will now be described. The shaft portion 48 is hollow and is mounted, through the intermediation of an insulating sleeve 104, on one end of a drive shaft 105 rotatably mounted in bearings of spaced frame portions 106 of a speed reducer 107 mounted on the bracket 35 in the regulator housing. The shaft 105 is driven by an electric motor 108, mounted on the speed reducer, through suitable speed reducing gears 109 so proportioned to cause the shaft to rotate at a proper rate in accordance with the room air circulation conditions under which the system is to be controlled, which rate of speed of the shaft under ordinary conditions would be about one revolution per minute. The motor 108 is normally maintained in constant circuit connection with the power lines 96, which may include a switch 110 for rendering the motor ineffective in the event a delaying valve controlling operation is not desired at certain periods.

The interruptor includes a circuit connector 111 in the form of a vertically disposed strip, of flexible material, mounted at its central portion on a base block 112, of insulation, secured on the speed reducer frame 106. The lower end of the strip is in constant sliding contact with one side of the shaft portion 48, and the upper end of the strip is normally disposed within a cord of the path of a continuously moving or rotating circuit-interrupting switch arm 113 in circuit connection with the side of the power lines 96, opposite that common to the relays, by way of a conductor 114 having a flexible terminal 115, mounted on said base block 112 and being in contact with the end of the hub of the arm. The arm 113 is mounted on one end of a drive shaft 116, so as to be insulated therefrom, which shaft is driven by the shaft 105 on which is a pinion 117 meshing with a gear 118 on the shaft 116.

The gears 117 and 118 are so proportioned as to cause the switch arm 113 to rotate once upon eight revolutions of the shaft portion 48, whereupon, as best seen in Figs. 4 and 5, circuit will be established at intervals to either relay 67 or 70, when either strip 43 or 44 is contacting with the pin 47, only during about one fourth of a revolution of the arm as it contacts with the connector strip 111.

Assuming that the shaft 116 of the interruptor arm 113 revolves once every eight minutes, it will be seen that it contacts with the contactor strip 111 during a period of about two minutes, also, assuming that the contactor pin revolves once a minute, it will be seen that the valve controlling operation will be only effective during various periods of two one minute intervals, as determined by the temperature demand, at cycles of eight minutes.

It will be understood that the timing of the interruptor and its cooperating sliding contact switch may be such as to cause a variously lagging or delayed valve controlling operation that is in accordance with the room air circulation conditions, in maintaining a more constant mean effective temperature in the radiator. Therefore the invention is not to be limited to the particular timing of the elements as herein described or illustrated, as the disclosure only forms one embodiment of the invention. For example, under certain favorable air circulation conditions, it may be advisable to include on the hub of the interruptor arm 113, a plurality of such arms equally spaced or not about the axis of the hub so as to shorten the durations of said cycles.

It may be mentioned that the diaphragm is mounted adjustably so that it may be adjusted with respect to the switch arm 42, by means of the adjusting screws 37 and/or 38, in controlling the predetermined room temperature limit.

One of the advantages of the association of the present invention with the regulating means disclosed and claimed in said prior patent, is that the damper 29 can be adjusted to admit into the housing compartment 25, containing the motor 108, a slight amount of cold air circulating downward along the wall in excess of that normally required, to compensate for any heat that may be generated by the motor, whereby in the compartment would be maintained a mean temperature between that of the cold and warm air currents circulating along the wall upon which is to be based the regulation of the system by the diaphragm in said compartment.

Although the switch structure of the invention is shown and described in association with a heating system, in disclosing one use for the invention, the invention is not to be so limited in this connection as there are other similar uses to which the invention can be put.

Having thus described my invention, I claim:

1. In a switch of the class described, a contact arranged laterally of and rotatable about an axis, means to rotate the contact at a given rate, a switch member movable back and forth between limits, means for controlling movement of the member into various positions between its limits, and two resilient strips mounted on the member and extending therefrom in spaced relation and having free end portions respectively arranged at opposite sides of the path of the contact and normally positioned to allow of rotation of the contact between them when the member is at a neutral position between its limits, said end portions extending angularly toward the path of the contact for engagement with the contact so as to be deflected thereby on the member during an interval of each revolution of the contact when the member is displaced from its neutral position and so that either end portion will project into the path of the contact an extent proportional to the amount of displacement of the member from its neutral position to vary the duration of the engagement with the contact accordingly.

2. The structure as defined in claim 1, wherein the said strips are bendable so that the free end portion of either strip may be manually bent into various angles toward the path of the contact for regulating the extent to which the end portion will project into the path of the contact when the member is displaced from its neutral position.

3. In a switch of the class described, a contact arranged laterally of and rotatable about an axis, means to rotate the contact at a given rate, a switch member movable back and forth between limits, means for controlling movement of the member into various positions between its limits, and two resilient strips mounted on the member and extending therefrom in spaced relation and having free end portions respectively arranged at opposite sides of the path of the contact and normally positioned to allow of rotation of the contact between them when the member is at a neutral position between its limits, said end portions being formed helically about the axis of rotation of the contact in opposition to each other for engagement with the contact during an interval of each revolution thereof when the member has been displaced from its neutral position and so that either end portion will project into the path of the contact an extent proportional to the amount of displacement of the member from its neutral position to vary the duration of engagement with the contact accordingly.

4. The structure as defined in claim 3, wherein said strips are bendable so that the free end portion of either strip may be manually bent into various helical angles about the axis of rotation of the contact for regulating the extent to which the end portion will project into the path of the contact when the member has been displaced from its neutral position.

5. In a switch of the class described, a contact arranged laterally of and rotatable about an axis, means to rotate the contact at a given rate, a switch member movable back and forth between limits, means for controlling movement of the member into various positions between its limits, and two resilient strips mounted on the member and extending therefrom in spaced relation and having bifurcated free end portions respectively arranged at opposite sides of the path of the contact and normally positioned to allow of rotation of the contact between them when the member is at a neutral position between its limits, each bifurcated end portion having its bifurcations or prongs formed helically about the axis of rotation of the contact for engagement with the contact during an interval of each revolution thereof when the member is displaced from its neutral position and so that either end portion will project into the path of the contact an extent proportional to the amount of displacement of the member from its neutral position to vary the duration of the engagement with the contact accordingly.

6. In a switch of the class described, a contact arranged laterally of and rotatable about an axis, means to rotate the contact at a given rate, a switch member movable back and forth between limits, means for controlling movement of the member into various positions between its limits, and two elongated resilient strips mounted fixedly at one end on the member and extending therefrom in spaced parallel relation and having free end portions respectively arranged at opposite sides of the path of the contact and normally positioned to allow of rotation of the contact between them when the member is at a neutral position between its limits, said end portions comprising angular extensions of the strips extending angularly toward the path of the contact for engagement with the contact so as to be deflected thereby on the member during an interval of each revolution of the contact when the member is displaced from its neutral position and so that either end portion will project into the path of the contact an extent proportional to the amount of displacement of the member from its neutral position to vary the duration of the engagement with the contact accordingly.

JOHN C. HORNUNG.